(12) United States Patent
Burke et al.

(10) Patent No.: US 11,708,904 B2
(45) Date of Patent: Jul. 25, 2023

(54) CABLE ACTUATED MULTI-PAWL PARK LOCK

(71) Applicant: Schaeffler Technologies AG & Co. KG, Herzogenaurach (DE)

(72) Inventors: Peter Burke, Charlotte, NC (US); Michael Hodge, Creston, OH (US); Tobias Heumann, Arberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 5 days.

(21) Appl. No.: 17/368,897

(22) Filed: Jul. 7, 2021

(65) Prior Publication Data
US 2023/0008408 A1 Jan. 12, 2023

(51) Int. Cl.
*F16H 63/34* (2006.01)

(52) U.S. Cl.
CPC ..... *F16H 63/3466* (2013.01); *F16H 63/3425* (2013.01)

(58) Field of Classification Search
CPC .......................... F16H 63/3425; F16H 63/3466
See application file for complete search history.

(56) References Cited

U.S. PATENT DOCUMENTS

| | | | |
|---|---|---|---|
| 9,080,664 B2* | 7/2015 | Jeong | F16H 59/0208 |
| 10,900,565 B2 | 1/2021 | Coats et al. | |
| 2002/0020589 A1* | 2/2002 | Tagami | B60T 1/005 |
| | | | 188/31 |
| 2007/0221434 A1* | 9/2007 | Chino | F16C 1/18 |
| | | | 180/402 |
| 2009/0151501 A1* | 6/2009 | Jung | F16H 59/10 |
| | | | 74/502 |
| 2017/0234428 A1* | 8/2017 | Spooner | F16H 63/3491 |
| | | | 192/220.2 |
| 2018/0135752 A1* | 5/2018 | Li | F16H 63/3483 |
| 2021/0188238 A1* | 6/2021 | Smith | B60W 10/04 |

FOREIGN PATENT DOCUMENTS

DE 102019130830 A1 * 5/2021

* cited by examiner

*Primary Examiner* — Lori Wu

(57) ABSTRACT

A cable actuated multi-pawl park lock includes an actuator, a first park lock device arranged for engaging a first gear wheel, a first cable connecting the actuator to the first park lock device, a second park lock device arranged for engaging a second gear wheel, and a second cable connecting the actuator to the second park lock device. In some example embodiments, the actuator includes an actuator housing, the first park lock device includes a first park lock housing, the first cable includes a first outer jacket having a first end fixed to the actuator housing and a second end fixed to the first park lock housing, the second park lock device includes a second park lock housing, and the second cable includes a second outer jacket having a first end fixed to the actuator housing and a second end fixed to the second park lock housing.

8 Claims, 2 Drawing Sheets

CABLE ACTUATED MULTI-PAWL PARK LOCK

TECHNICAL FIELD

The present disclosure relates generally to a park lock, and more specifically to a cable actuated multi-pawl park lock.

BACKGROUND

Park locks are known. One example is shown and described in U.S. Pat. No. 10,900,565 to Coats et al. titled LOST MOTION TRANSMISSION SHIFTER.

SUMMARY

Example embodiments broadly comprise a cable actuated multi-pawl park lock including an actuator, a first park lock device arranged for selectively preventing rotation of a first gear wheel, a first cable connecting the actuator to the first park lock device, a second park lock device arranged for selectively preventing rotation of a second gear wheel, and a second cable connecting the actuator to the second park lock device. In some example embodiments, the actuator includes an actuator housing, the first park lock device includes a first park lock housing, the first cable includes a first outer jacket having a first outer jacket first end fixed to the actuator housing and a first outer jacket second end fixed to the first park lock housing, the second park lock device includes a second park lock housing, and the second cable includes a second outer jacket having a second outer jacket first end fixed to the actuator housing and a second outer jacket second end fixed to the second park lock housing.

In an example embodiment, the first outer jacket includes a first threaded portion fixed to the actuator housing by a first nut threaded onto the first threaded portion, and the second outer jacket includes a second threaded portion fixed to the actuator housing by a second nut threaded onto the second threaded portion. In an example embodiment, the first outer jacket includes a third threaded portion fixed to the first park lock housing by a third nut threaded onto the third threaded portion, and the second outer jacket includes a fourth threaded portion fixed to the second park lock housing by a fourth nut threaded onto the fourth threaded portion.

In some example embodiments, the actuator includes a displaceable plate, the first park lock device includes a first lock mechanism with a first tooth, the first cable includes a first inner push-pull cable connected to the displaceable plate and the first lock mechanism for engaging and disengaging the first tooth with the first gear wheel, the second park lock device includes a second lock mechanism with a second tooth, and the second cable includes a second inner push-pull cable connected to the displaceable plate and the second lock mechanism for engaging and disengaging the second tooth with the second gear wheel.

In an example embodiment, the actuator also includes a threaded shaft with an axis and an electric motor arranged to rotate the threaded shaft. The displaceable plate is threaded onto the threaded shaft, the displaceable plate is arranged to displace in a first axial direction when the electric motor rotates the shaft in a first rotational direction, and the displaceable plate is arranged to displace in a second axial direction, opposite the first axial direction, when the electric motor rotates the shaft in a second rotational direction, opposite the first rotational direction.

In an example embodiment, the first park lock device includes a slidable connector having a first segment with a first partial cylindrical surface, and a second segment with a second partial cylindrical surface. The first inner push-pull cable includes a first barrel arranged to pull on the first partial cylindrical surface to engage the first tooth with the first gear wheel, and push on the second partial cylindrical surface to disengage the first tooth from the first gear wheel. The second park lock device includes a slidable connector having a third segment with a third partial cylindrical surface, and a fourth segment with a fourth partial cylindrical surface. The second inner push-pull cable includes a second barrel arranged to pull on the third partial cylindrical surface to engage the second tooth with the second gear wheel, and push on the fourth partial cylindrical surface to disengage the second tooth from the second gear wheel.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
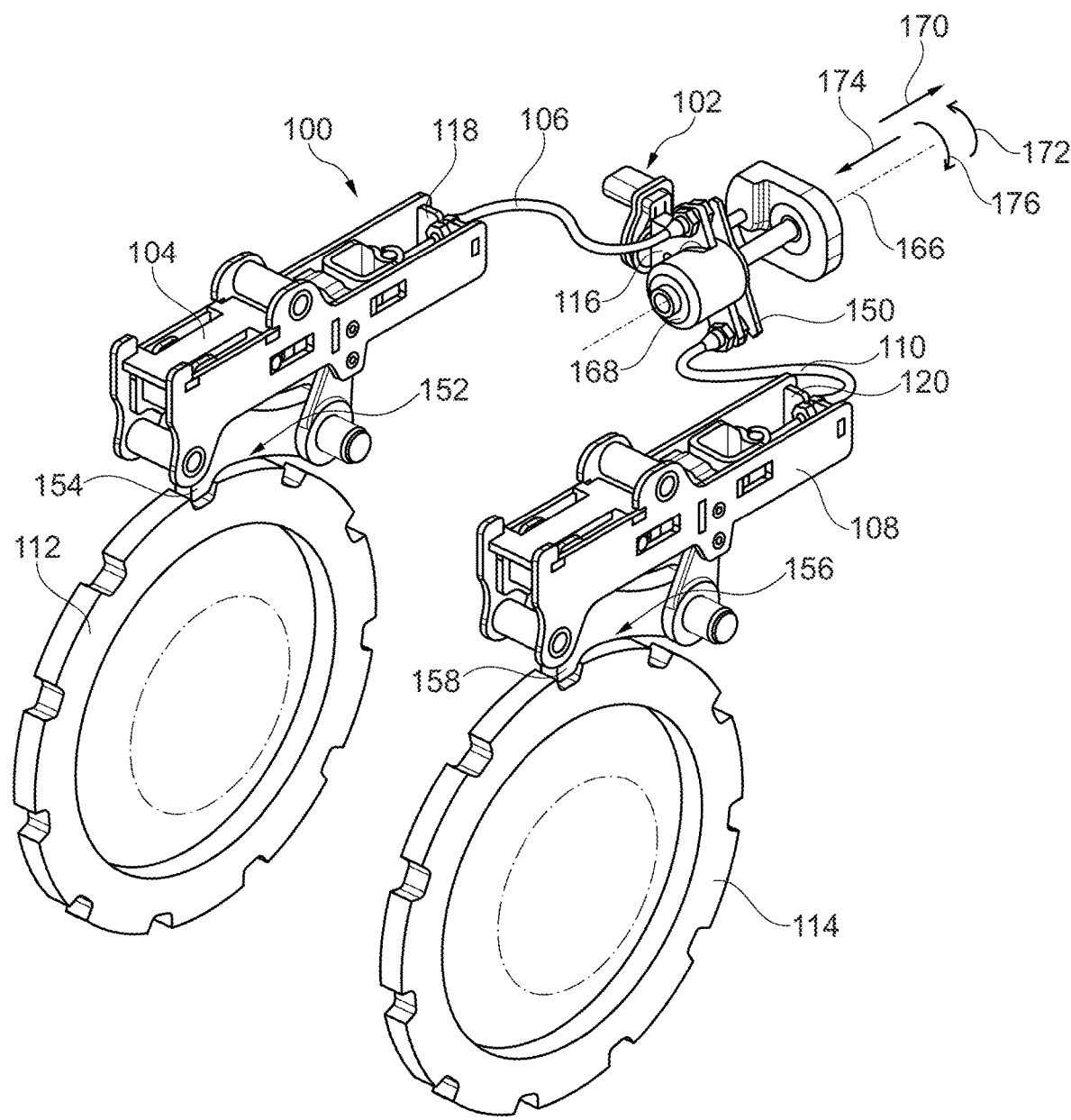
FIG. 1 illustrates a perspective view of a cable actuated multi-pawl park lock according to an example embodiment.
Figure 2:
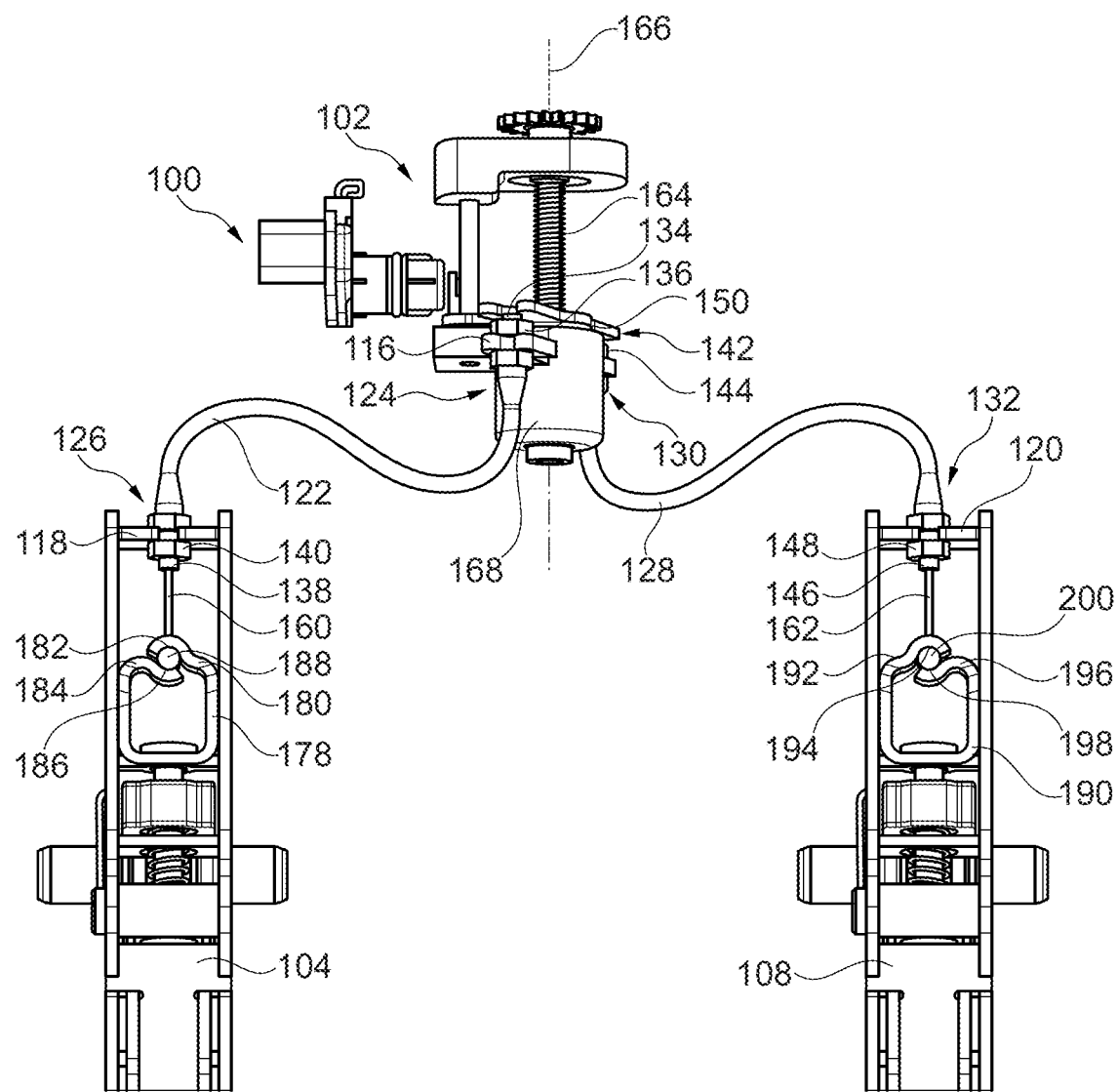
FIG. 2 illustrates a top view of the cable actuated multi-pawl park lock of FIG. 1.

The following description is made with reference to FIGS. 1-2. FIG. 1 illustrates a perspective view of cable actuated multi-pawl park lock 100 according to an example embodiment. FIG. 2 illustrates a top view of the cable actuated multi-pawl park lock of FIG. 1. Cable actuated multi-pawl park lock 100 includes actuator 102, park lock device 104, cable 106, park lock device 108, and cable 110. Park lock device 104 is arranged for selectively preventing rotation of gear wheel 112 and park lock device 108 is arranged for selectively preventing rotation of gear wheel 114 as described in more detail below. Cable 106 connects the actuator to park lock device 104 and cable 110 connects the actuator to park lock device 108.

Actuator 102 includes actuator housing 116, park lock device 104 includes park lock housing 118, and park lock device 108 includes park lock housing 120. Cable 106 includes outer jacket 122 with cable end 124 fixed to the actuator housing and cable end 126 fixed to housing 118. Cable 110 includes outer jacket 128 with cable end 130 fixed to the actuator housing and cable end 132 fixed to housing 120. Outer jacket 122 includes threaded portion 134 fixed to the actuator housing by nut 136 threaded onto threaded portion 134 and outer jacket 128 includes threaded portion 138 fixed to the actuator housing by nut 140 threaded onto threaded portion 138. Outer jacket 122 includes threaded portion 142 fixed to park lock housing 118 by nut 144 threaded onto threaded portion 142 and outer jacket 128 includes threaded portion 146 fixed to the park lock housing 120 by nut 148 threaded onto threaded portion 146.

Actuator 102 includes displaceable plate 150, park lock device 104 includes lock mechanism 152 with tooth 154, and park lock device 108 includes lock mechanism 156 with tooth 158. Cable 106 includes inner push-pull cable 160 connected to the displaceable plate and the lock mechanism 152 for engaging and disengaging tooth 154 with gear wheel 112 and cable 110 includes inner push-pull cable 162 connected to the displaceable plate and lock mechanism 156 for engaging and disengaging tooth 158 with gear wheel 114.

Actuator 102 includes threaded shaft 164 with axis 166 and electric motor 168 arranged to rotate the threaded shaft. The displaceable plate is threaded onto the threaded shaft. The displaceable plate is arranged to displace in axial direction 170 when the electric motor rotates the shaft in rotational direction 172, and the displaceable plate is arranged to displace in axial direction 174, opposite axial direction 170, when the electric motor rotates the shaft in rotational direction 176, opposite rotational direction 172.

Park lock device 104 includes slidable connector 178 with segment 180 having partial cylindrical surface 182 and segment 184 with partial cylindrical surface 186. Inner push-pull cable 160 includes barrel 188 arranged to pull on partial cylindrical surface 182 to engage tooth 154 with gear wheel 112 and push on partial cylindrical surface 186 to disengage tooth 154 from gear wheel 112. Similarly, park lock device 108 includes slidable connector 190 with segment 192 having partial cylindrical surface 194 and segment 196 with partial cylindrical surface 198. Inner push-pull cable 162 includes barrel 200 arranged to pull on partial cylindrical surface 194 to engage tooth 158 with gear wheel 114, and push on partial cylindrical surface 198 to disengage tooth 158 from gear wheel 114.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Cable actuated multi-pawl park lock
102 Actuator
104 Park lock device (first)
106 Cable (first)
108 Park lock device (second)
110 Cable (second)
112 Gear wheel (first)
114 Gear wheel (second)
116 Actuator housing
118 Park lock housing (first)
120 Park lock housing (second)
122 Outer jacket (first cable)
124 Cable end (first outer jacket first end)
126 Cable end (first outer jacket second end)
128 Outer jacket (second cable)
130 Cable end (second outer jacket first end)
132 Cable end (second outer jacket second end)
134 Threaded portion (first)
136 Nut (first)
138 Threaded portion (second)
140 Nut (second)
142 Threaded portion (third)
144 Nut (third)
146 Threaded portion (fourth)
148 Nut (fourth)
150 Displaceable plate
152 Lock mechanism (first)
154 Tooth (first)
156 Lock mechanism (second)
158 Tooth (second)
160 Inner push-pull cable (first)
162 Inner push-pull cable (second)
164 Threaded shaft
166 Axis
168 Electric motor
170 Axial direction (first)
172 Rotational direction (first)
174 Axial direction (second)
176 Rotational direction (second)
178 Slidable connector (first)
180 Segment (first)
182 Partial cylindrical surface (first)
184 Segment (second)
186 Partial cylindrical surface (second)
188 Barrel (first)
190 Slidable connector (second)
192 Segment (third)
194 Partial cylindrical surface (third)
196 Segment (fourth)
198 Partial cylindrical surface (fourth)
200 Barrel

What is claimed is:

1. A cable actuated multi-pawl park lock, comprising:
an actuator having an electric motor and a displaceable plate configured to be axially displaced by the electric motor;
a first park lock device arranged for selectively preventing rotation of a first gear wheel;
a first cable connecting the actuator to the first park lock device;
a second park lock device arranged for selectively preventing rotation of a second gear wheel; and
a second cable connecting the actuator to the second park lock device.

2. The cable actuated multi-pawl park lock of claim 1 wherein:
the actuator comprises an actuator housing;
the first park lock device comprises a first park lock housing;
the first cable comprises a first outer jacket having a first outer jacket first end fixed to the actuator housing and a first outer jacket second end fixed to the first park lock housing;
the second park lock device comprises a second park lock housing; and
the second cable comprises a second outer jacket having a second outer jacket first end fixed to the actuator housing and a second outer jacket second end fixed to the second park lock housing.

3. The cable actuated multi-pawl park lock of claim 2 wherein:
the first outer jacket comprises a first threaded portion fixed to the actuator housing by a first nut threaded onto the first threaded portion; and
the second outer jacket comprises a second threaded portion fixed to the actuator housing by a second nut threaded onto the second threaded portion.

4. The cable actuated multi-pawl park lock of claim 2 wherein:
the first outer jacket comprises a third threaded portion fixed to the first park lock housing by a third nut threaded onto the third threaded portion; and
the second outer jacket comprises a fourth threaded portion fixed to the second park lock housing by a fourth nut threaded onto the fourth threaded portion.

5. The cable actuated multi-pawl park lock of claim 1 wherein:
the first park lock device comprises a first lock mechanism with a first tooth;
the first cable comprises a first inner push-pull cable connected to the displaceable plate and the first lock mechanism for engaging and disengaging the first tooth with the first gear wheel;
the second park lock device comprises a second lock mechanism with a second tooth; and
the second cable comprises a second inner push-pull cable connected to the displaceable plate and the second lock mechanism for engaging and disengaging the second tooth with the second gear wheel.

6. The cable actuated multi-pawl park lock of claim 5 wherein the actuator further comprises:
a threaded shaft with an axis, the threaded shaft configured to be rotated by the electric motor, wherein:
the displaceable plate is threaded onto the threaded shaft;
the displaceable plate is arranged to displace in a first axial direction when the electric motor rotates the shaft in a first rotational direction; and
the displaceable plate is arranged to displace in a second axial direction, opposite the first axial direction, when the electric motor rotates the shaft in a second rotational direction, opposite the first rotational direction.

7. The cable actuated multi-pawl park lock of claim 5 wherein:
the first park lock device comprises a slidable connector comprising:
a first segment with a first partial cylindrical surface; and
a second segment with a second partial cylindrical surface;
the first inner push-pull cable comprises a first barrel arranged to:
pull on the first partial cylindrical surface to engage the first tooth with the first gear wheel; and
push on the second partial cylindrical surface to disengage the first tooth from the first gear wheel;
the second park lock device comprises a slidable connector comprising:
a third segment with a third partial cylindrical surface; and
a fourth segment with a fourth partial cylindrical surface;
the second inner push-pull cable comprises a second barrel arranged to:
pull on the third partial cylindrical surface to engage the second tooth with the second gear wheel; and
push on the fourth partial cylindrical surface to disengage the second tooth from the second gear wheel.

8. A cable actuated multi-pawl park lock, comprising:
an actuator having an actuator housing;
a first park lock device arranged for selectively preventing rotation of a first gear wheel;
a first cable connecting the actuator to the first park lock device, the first cable comprises a first outer jacket having a first outer jacket first end fixed to the actuator housing;
a second park lock device arranged for selectively preventing rotation of a second gear wheel; and
a second cable connecting the actuator to the second park lock device, the second cable comprises a second outer jacket having a second outer jacket end fixed to actuator housing.

* * * * *